May 2, 1961  H. RICH ET AL  2,982,915
HIGH-SHOCK MOVING-COIL ELECTRICAL INSTRUMENT
Filed June 16, 1958

INVENTORS
Harold Rich
Daniel W. Baker, II
BY *Richard E. Hosley*
Their Attorney

2,982,915
HIGH-SHOCK MOVING-COIL ELECTRICAL INSTRUMENT

Harold Rich, Lynnfield, and Daniel W. Baker 2nd, Dartmouth, Mass., assignors to General Electric Company, a corporation of New York Filed June 16, 1958, Ser. No. 742,116

1 Claim. (Cl. 324—154)

This invention relates to electrical instruments of the moving coil type and, more particularly, to the construction and connection of the moving coil.

In the usual D'Arsonval movement, there is provided a coil which rotates or swings within a magnetic field. Current flow through the coil produces a magnetic field which interacts with a fixed magnetic field to produce a deflection of the coil against the bias or restoring torque of spring members. The deflection torque is proportional to the current flow through the coil while the restoring torque of the spring is proportional to deflection with the resultant coil deflection determined by a position wherein the deflecting and restoring torques are equal.

It is known to utilize the restoring spring as a conductor of current in addition to providing the opposing force necessary to achieve a condition of equilibrium for the coil and its associated pointer. Where a high-shock instrument is required for use in high-speed vehicles, aircraft or other installations subject to shock or vibrations, it is necessary to use springs made of material that will resist permanent deformation.

Such springs inherently are constructed of relatively high-resistance material. Where the spring is utilized as a current conductor for the coil, the high resistance has a deleterious effect of limiting coil current flow and, therefore, sensitivity of the instrument. Also, and even more important, the temperature coefficient of resistance of the spiral material is inherently relatively high so that the resultant resistance changes with ambient temperatures cause variations in the accuracy of the instrument.

It has been the practice in the past to consider both the desired mechanical characteristics of the restoring spring and the desired electrical characteristics and select a spring material which, at the best, would be only a compromise in that the more desirable the mechanical characteristics obtained, the less desirable are the electrical characteristics.

It is an object of this invention to provide an improved moving coil arrangement in an electrical instrument with restoring springs utilized as electrical conductors for the coil wherein the desired mechanical properties may be provided without materially adversely affecting the electrical properties.

It is another object of this invention to concurrently provide in an improved restoring spring arrangement utilized as electrical conductors for the coil of an electrical instrument high torque and low electrical resistance characteristics.

It is still another object of this invention to provide an improved restoring spring arrangement for the moving coil of an electrical instrument in which a high torque may be realized while providing at the same time a reduced temperature coefficient of resistance.

It is a still further object of this invention to provide a high-torque, low resistance spring arrangement for the moving coil of an electrical instrument in which the electrical resistance is relatively unaffected by ambient temperature.

Further objects and advantages of this invention will become apparent as the following description proceeds and the features of novelty which characterize the invention will be pointed out with particularity in the claims annexed to forming a part of this specification.

In accordance with one form of this invention, one end of the moving coil is connected through a low resistance, low-torque spring to the input of the instrument while the other end of the coil is connected through an electrically parallel combination of a high torque, high resistance spring and a low torque, low resistance spring with the shaft upon which the coil rotates being utilized as a common connection in the electrical circuit.

For a better understanding of the invention, reference may be had to the accompanying drawings in which.

Figure 1:
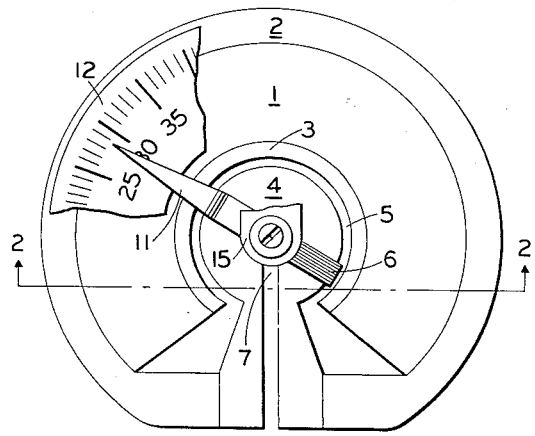
Figure 1 is a plan view, partially in section, of an instrument movement embodying one form of the invention.

Referring to Figure 1, the invention is shown, by way of example, embodied in a "concentric-scale" type of instrument in which the fixed magnetic field is provided by a sector-shaped permanent magnet 1 secured within a steel shell 2. A soft-steel pole piece 3 is secured to the magnet 1 in the central region thereof, and concentrically arranged about and spaced from a portion of the soft-steel core 4 so as to form an air gap 5 therebetween. A rotatably mounted moving coil 6 is adapted to rotate within the air gap 5 and the slot 7 of core 4.

Figure 2:
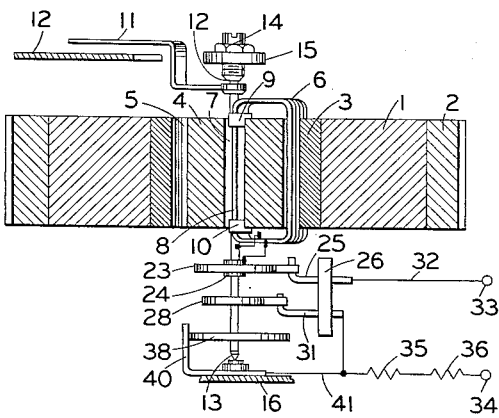
Figure 2 is a sectional elevation taken along the line 2—2 in Figure 1 looking in the direction of the arrows and including the external electrical connections to the moving coil; and, Figure 3 is an isometric view of a portion of Figure 2 showing the springs and electrical connections to the moving coil.

As best illustrated by Figure 2, the moving coil 6 is fixedly secured to an electrically conductive coil shaft 8 by suitable means such as clips 9 and 10. Also secured to shaft 8 for rotation therewith is a pointer 11 which cooperates with the suitable scale 12 to indicate the degree of rotation of the moving coil 6 relative to a zero or reference position (not shown).

The shaft 8 is rotatably mounted and supported by bearings at the ends thereof indicated generally as 12 and 13 and bearing pressure can be adjusted through rotation of bearing adjustment means 14. The bearings and the associated moving coil mechanism are supported by portions 15 and 16 of the instrument supporting framework.

The instrument described thus far is of conventional design and is commonly known as a concentric-scale instrument or long-scale instrument allowing as much as 250° rotation of the coil. The operation of the instrument is well known in the art and comprises the production of torque by the interaction of the fixed magnetic field produced in the air gap 5 by permanent magnet 1 and the associated pole piece 3 and soft-core 4 with the magnetic field produced by current flow through the coil 6. The position assumed by the pointer 11 is dependent upon the resultant torque of the magnetic fields and the restoring torque as provided by the coil spring arrangement which will now be described with reference to Figures 2 and 3.

Figure 3:
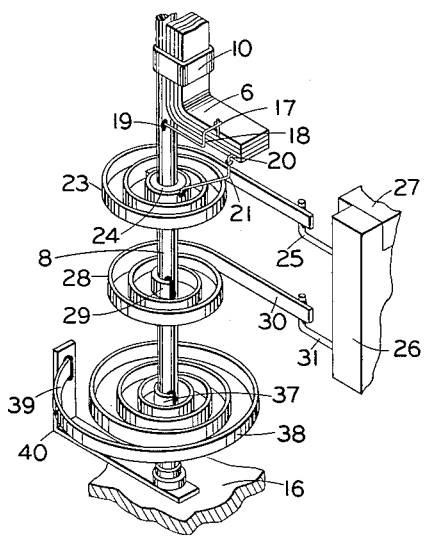

Referring to Figures 2 and 3, one end of moving coil 6 is brought out by way of connection 17 and lead 18 and electrically connected to shaft 8 such as by soldering at point 19. The other end of coil 6 is brought out by way of connection 20 and lead 21 and electrically connected such as by soldering to the inner end of spiral spring 23. Spiral spring 23 is separated and insulated from shaft 8 by means of a tubular insulating sleeve 24 interposed between the inner end of the spring and the shaft. The inner end of the spring 23 is fixedly secured to the insulating sleeve 24 which in turn is fixedly secured to shaft 8. The outer end of spring 23 is secured to electrical connector 25 by suitable means such as soldering. The electrical connector 25 is imbedded in a connector block 26 which in turn is firmly secured to the instrument framework or housing 27. Spiral spring 28 has its inner end 29 electrically connected to shaft 8 by suitable means such as soldering, and its outer end 30 connected to electrical connector 31 which is imbedded in the connector block 26.

As illustrated in Figure 2, the electrical connector 25 is connected by way of lead 32 to the instrument input terminal 33. Electrical connector 31 is connected to the other instrument input terminal 34 by way of temperature compensating resistor 35 exhibiting a negative temperature coefficient of resistance and range multiplying resistor spool 36. Whether resistor 36 is needed and its value is determined by the magnitude of the electrical signal being measured.

Referring again to Figures 2 and 3, the inner end 37 of spiral spring 38 is electrically connected to shaft 8 by suitable means such as soldering and the outer end 39 is electrically connected to the L-shaped adjustment bracket 40. Bracket 40 is adjustably secured between the bearing 13 and the housing 16 so that rotation of the bracket will move the moving system so that pointer 11 will indicate the desired zero or reference point under zero signal input conditions. Bracket 40 is electrically connected by means of lead 41 to the electrical connector 31 so that spiral springs 38 and 28 are electrically in parallel with their inner ends electrically connected to shaft 8 and their outer ends electrically connected to terminal 31.

Springs 23 and 28 should be constructed of a low resistance, low-torque wire such as a silver copper alloy. In a 50 millivolt instrument, a suitable wire has been found comprising 94% copper and 6% silver. Such a combination produces an alloy of high conductivity. The springs may be conveniently formed from .0045" diameter wire wound into three turns forming a finished spring having the dimensions of ½" outside diameter and ¼" inside diameter with the cross section dimensions of the wire being .001" thick by .0195" wide. It has been found desirable to heat treat the springs at 310° C. for 4½ hours. The approximate resistance of a spring fabricated as above will be .22 ohm while the torque will be approximately .093 millimeter gram per 90° deflection.

Spring 38 for the same instrument should be of a high-torque material in order to provide the required restoring torque for the moving system and may conveniently be fabricated of wire commercially known as 720 alloy. This alloy is a nickel-copper alloy which comprises 18.5 to 21.5% manganese, 18.5 to 21.5% nickel, 0.10% iron maximum, with the remainder being copper such that the copper, manganese, and nickel constitute at least 99.5% of the mixture. The high-torque spring 38 may be formed from a .007" diameter wire wound into a 7 turn spring with the finished cross section dimensions being .0211" wide and .0018" thick. It has been found desirable to heat treat the spring at approximately 400° C. for six hours. The resultant spring exhibits an approximate resistance of 5.53 ohms and a torque of .46 mmg. This is to be contrasted with springs 23 and 28 which exhibit a resistance of .22 ohm with a torque of .093 mmg.

It is thus apparent that an instrument moving coil system has been provided in which a relatively high-torque movement exhibits a relatively low electrical resistance. In the arrangement given by way of example, the combined torque of springs 28 and 38 is in excess of 0.6 mmg. while the combined electrical resistance is less than .22 ohm instead of being over 5.5 ohms, or less than $\frac{1}{25}$ that obtained through use of the high torque spring alone.

Having thus described the invention, it is to be understood that the foregoing disclosure relates only to a preferred embodiment and that numerous modifications or alterations may be made therein without departing from the spirit and scope of the invention as set forth in the appended claim.

What we claim as new and desire to secure by Letters Patent of the United States is:

In a moving coil electrical indicating instrument, a moving coil, a rotatable mounting for said coil including an electrically conductive shaft, a first spiral spring with its outer end fixed relative to said coil at least during operation of said instrument as an indicator and its inner end electrically connected to said shaft, a second spiral spring having its outer end fixed relative to said coil and its inner end electrically connected to said shaft, said first and second springs being connected electrically in parallel with said first spring exhibiting high-torque relative to said second spring and said second spring exhibiting low-electrical resistance relative to said first spring, a third spiral spring, an insulating sleeve fixedly secured and interposed between said shaft and the inner end of said third spring, said inner end of said third spring being electrically connected to one end of said coil and being fixed to said insulating sleeve and the outer end of said third spring being fixed relative to said coil, and the other end of said coil being electrically connected to said conductive shaft, said first spring being constructed of nickel-copper wire and said second and third springs being constructed of silver-copper wire.

References Cited in the file of this patent

UNITED STATES PATENTS

| | | |
|---|---|---|
| 1,022,517 | Thomson | Apr. 9, 1912 |
| 1,633,912 | Vawter | June 28, 1927 |
| 2,290,849 | Triplett | July 21, 1942 |
| 2,334,584 | Rich | Nov. 16, 1943 |
| 2,508,380 | Freedman | May 23, 1950 |
| 2,508,410 | Lunas | May 23, 1950 |